3,192,267
PREPARATION OF PROPYLATED DERIVATIVE
OF PHENANTHRENE
Gérard Nomine, Noisy-le-Sec, and Robert Bucourt,
Villiers-le-Bel, France, assignors, by mesne assignments, to Roussel-UCLAF, S.A., Paris, France, a corporation of France
No Drawing. Filed Dec. 7, 1961, Ser. No. 157,847
Claims priority, application France, Dec. 28, 1960, 848,181
4 Claims. (Cl. 260—586)

The present invention relates to a new propylated derivative of phenanthrene, particularly to 2-methyl-3-oxo-7 - methoxy - 10a - n - propyl - 1,2,3,9,10,10a-hexahydrophenanthrene of the Formula I:

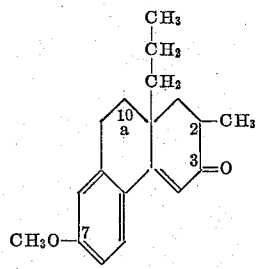

(I)

and a process for its preparation.

The propylated derivative of phenanthrene, compound of the invention, is useful as an intermediate in chemical syntheses and can serve particularly as an intermediate in the synthesis of analogs of natural steroids, and particularly in the preparation of 18-nor-13β-n-propyl-estradiol, which compound is described in copending, commonly-assigned, United States patent application Serial No. 96,061, filed January 19, 1961, and now abandoned. This application discloses that the 13β-n-propyl derivative of 18-nor-estradiol has a very high estrogenic power.

It is an object of the present invention to obtain 2 - methyl - 3-oxo-7-methoxy-10a-n-propyl-1,2,3,9,10,10a-hexahydrophenanthrene having the formula:

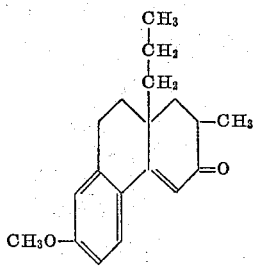

A further object of the invention is the development of a process for producing 2-methyl-3-oxo-7-methoxy-10a-n-propyl-1,2,3,9,10,10a-hexahydrophenanthrene.

Another object of the invention is the obtention of the following novel intermediates:

(a) 2-formyl-2-allyl-6-methoxy-tetralone-1;
(b) 2-allyl-6-methoxy-tetralone-1;
(c) 2-formyl-2-n-propyl-6-methoxy-tetralone-1;
(d) 2-n-propyl-6-methoxy-tetralone-1.

These and other objects of the invention will become more apparent as the description thereof proceeds.

The process of the present invention involves condensing an alkyl halide selected from the group consisting of allyl halide and n-propyl halide with 2-hydroxy methylene-6-methoxy-tetralone-1 in the presence of an alkaline condensation agent, alkalizing the resulting compound with an aqueous alkali metal hydroxide solution, recovering 2-n-propyl-6-methoxy-tetralone-1 by a process selected from the group consisting of direct recovery where said alkyl halide was n-propyl halide and hydrogenation of 2-allyl-6-methoxy-tetralone-1 in the presence of a hydrogenation catalyst and direct recovery where said alkyl halide was allyl halide, condensing said 2-n-propyl-6-methoxy-tetralone-1 with methyl isopropenyl ketone, and recovering 2-methyl-3-oxo-7-methoxy-10a-n-propyl-1,2,3, 9,10,-10a-hexahydrophenanthrene.

The process of producing 2-methyl-3-oxo-7-methoxy-10a-n-propyl-1,2,3,9,10,10a - hexahydrophenanthrene is shown by the flow diagram of Table I.

TABLE I

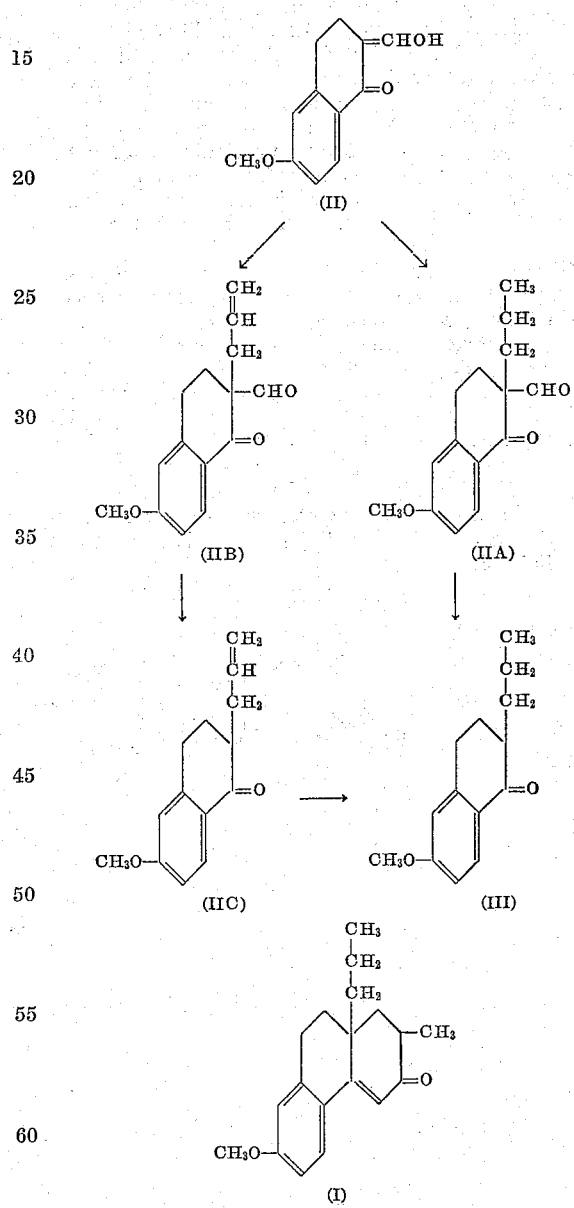

The starting compound of the synthesis, 2-hydroxy methylene-6-methoxy-tetralone-1, is produced according to Banerjee et al., J. Am. Chem. Soc. 78, 3769 (1956), or by the process described in copending, commonly-assigned United States patent application Serial No. 88,253, filed February 10, 1961, now United States Patent No. 3,134,817. By "tetralone-1" we mean a 1,2,3,4-tetrahydronaphthalene substituted in the 1 position by an oxo group.

The process of preparation of the propylated hexahydrophenanthrene of Formula I, object of the present invention, is principally characterized by the condensation of 2-n-propyl-6-methoxy-tetralone-1 (III) with methyl isopropenyl ketone.

This condensation is preferentially made in the presence of a lower alkanol, as, for example, methanol, and a hydroxide of a quaternary ammonium compound, particularly a tri-lower alkyl aralkyl ammonium hydroxide, such as, for example, trimethyl benzyl ammonium hydroxide.

The 2-n-propyl-6-methoxy-tetralone-1 (III) is obtained starting from 2-hydroxy methylene-6-methoxy-tetralone-1 (II) by one of two processes. In the first process, Compound II is condensed with an allyl halide in the presence of an alkaline condensation agent, particularly a metal hydride, such as, for example, sodium hydride, the product of the condensation, 2-formyl-2-allyl-6-methoxy-tetralone-1 (IIB) is subjected to the action of an alkaline base in water, particularly an aqueous solution of an alkali metal hydroxide, such as, for example, potassium hyroxide solution, and the 2-allyl-6-methoxy-tetralone-1 which results (IIC) is reduced, preferably by catalytic hydrogenation into the desired 2-n-propyl-6-methoxy-tetralone-1. The reduction is carried out in the presenece of a hydrogenation catalyst such as palladized carbon black.

In the second process of the invention, 2-n-propyl-6-methoxy-tetralone-1 (III) is prepared by direct condensation of a n-propyl halide with 2-hydroxymethylene-6-methoxy-tetralone-1 in the presence of an alkaline condensation agent. The 2-formyl-2-n-propyl-6-methoxy-tetralone-1 (IIA) is next subjected to the action of an alkaline base in water as above and the desired 2-n-propyl-6-methoxy-tetralone-1 (III) is obtained.

As indicated above, 2-methyl-3-oxo-7-methoxy-10a-n-propyl-1,2,3,9,10,10a-hexahydrophenanthrene (I) is useful as an intermediate in the preparation of 18-nor-13β-n-propylestradiol. A flow diagram of this synthesis is shown in Table II.

TABLE II

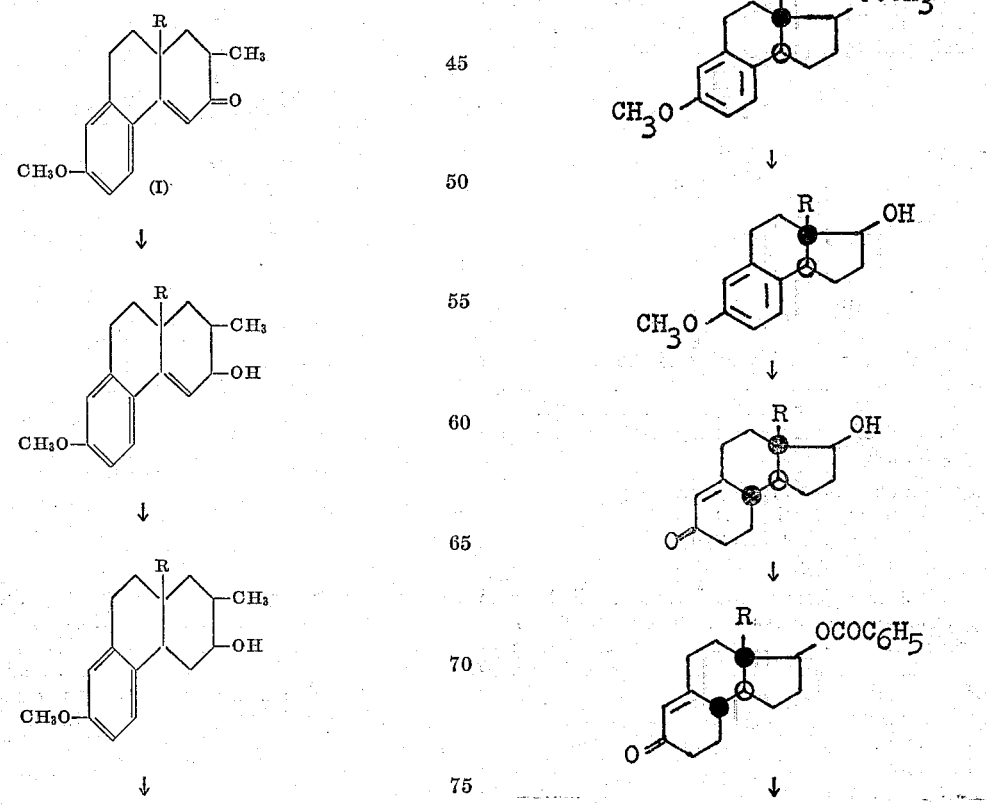

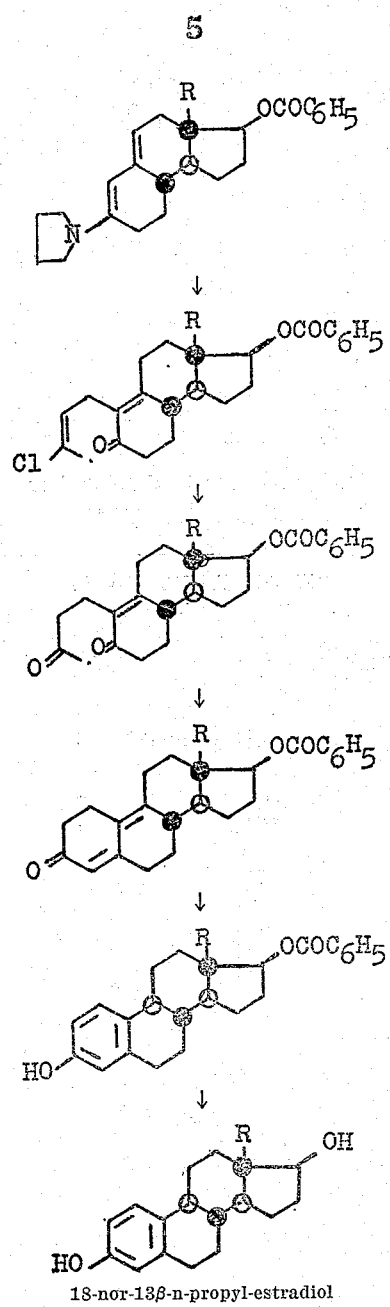

18-nor-13β-n-propyl-estradiol

R = the n-propyl radical.
Ts = the acyl radical of p-toluenesulfonic acid.

The following examples are given as specific embodiments, illustrative of the process of the invention and enable a better comprehension of the invention. They are not, however, to be deemed as limiting the invention in any manner.

EXAMPLE 1

*Preparation of 2-n-proply-6-methoxy-tetralone-1 (III) by allyl halide condensation*

Step A.—6 cc. of a suspension containing 20% sodium hydride in xylene were mixed with 25 cc. of anhydrous dimethylformamide. 10 gm. of 2-hydroxy methylene-6-methoxy-tetralone-1 in solution in 75 cc. of dimethylformamide were added to the mixture under agitation and cooled. Then 21.5 cc. of allyl bromide were added. The reaction mixture was agitated for a period of 22 hours at 0° C. The 2-formyl-2-allyl-6-methoxy-tetralone-1 (IIB) was not isolated, the solution obtained was used directly in the next step.

Step B.—13 cc. of a solution of potassium hydroxide containing 665 gm. per liter were added to the solution of 2-formyl-2-allyl-6-methoxy-tetralone-1 (IIB), obtained in Step A, and the mixture was agitated for a period of half an hour. The reaction mixture was diluted with 200 cc. of water and extracted with methylene chloride. The extracts were dried over magnesium sulfate and evaporated to dryness under vacuum. The residue consisted of 2-allyl-6-methoxy-tetralone-1 (IIC) which was utilized as such for the next step in the course of the synthesis.

Step C.—The raw 2-allyl-6-methoxy-tetralone-1 (IIC), obtained in Step B, was dissolved in 100 cc. of ethyl acetate. A suspension of 0.7 gm. of palladized carbon black containing 15% palladium (obtained by hydrogenation of palladium hydroxide) in 30 cc. of ethyl acetate was added to the solution and the mixture was hydrogenated for a period of an hour and a half. After filtration of the catalyst and evaporation of the solvent under vacuum, a residue was obtained which was subjected to chromatography over silica gel. Elution with methylene chloride containing 0.1% of acetone furnished 2-n-propyl-6-methoxy-tetralone-1 (III) having a melting point of 54° C. The product occurred in the form of white crystals which were soluble in alcohol, ether, acetone, benzene and chloroform, and insoluble in water and dilute aqueous acids or alkalis.

Ultraviolet spectrum (ethanol): $\lambda_{max.}$ 224 m$\mu$, $\epsilon$ = 12,500; $\lambda_{max.}$ 274 m$\mu$, $\epsilon$ = 15,800.

Microanalysis ($C_{14}H_{18}O_2$): Molecular weight = 218.28. Calculated: C, 77.03%; H, 8.31%. Found: C, 77.1%; H, 8.3%.

Infrared spectrum (chloroform): Bands at 1,670 cm.$^{-1}$, 1,598 cm.$^{-1}$, 1,572 cm.$^{-1}$, 1,493 cm.$^{-1}$.

This product is not described in the literature.

EXAMPLE 2

*Preparation of 2-n-propyl-6-methoxy-tetralone-1 by n-propyl halide condensation*

One can also obtain 2-n-propyl-6-methoxy-tetralone-1 by causing 2-hydroxy methylene-6-methoxy-tetralone-1 to react with n-propyl halide. This process is as follows:

Step A.—1 gm. of 2-hydroxy methylene-6-methoxy-tetralone-1 was introduced into 10 cc. of dimethylformamide. 0.7 cc. of a suspension containing 20% of sodium hydride in xylene was added thereto. Then, while cooling, 0.95 cc. of n-propyl iodide was added. The reaction mixture was allowed to stand for a period of twenty-one hours in an ice bath. The 2-formyl-2-n-propyl-6-methoxy-tetralone-1 (IIA) was not isolated, the solution obtained was used directly in the next step.

Step B.—1.3 cc. of a solution of potassium hydroxide containing 665 gm. per liter were added to the solution of 2-formyl-2-n-propyl-6-methoxy-tetralone-1 (IIA), obtained in step A. The mixture was heated slowly (without exceeding 40° C.) while distilling the major part of the dimethylformamide under vacuum. The residue was taken up in water and extracted with methylene chloride. After evaporation of the solvent under vacuum, the residue was dissolved in methylene chloride and subjected to chromatography over silica gel. Elution with methylene chloride containing 0.1% acetone furnished 2-n-propyl-6-methoxy-tetralone-1 (III), identical to the product obtained in Example 1.

EXAMPLE 3

*Preparation of 2-methyl-3-oxo-7-methoxy-10a-propyl-1,2,3,9,10,10a-hexahydrophenanthrene (I)*

The following mixture was heated to reflux under nitrogen for a period of twenty-two hours:

| | | |
|---|---|---|
| 2-n-propyl-6-methoxy-1-tetralone-1 | mg | 100 |
| Anhydrous methanol | cc | 1.2 |
| Methyl isopropenyl ketone | cc | 0.085 |
| Solution containing 40% of Triton B (trimethyl-benzylammonium hydroxide) in methanol | cc | 0.1 |

10 cc. of methylene chloride were then added to the reaction mixture which was washed with water until neutral, and then evaporated to dryness under vacuum. The residue was dissolved in methylene chloride and subjected to chromatography over silica gel. Elution with methylene chloride containing 0.1% of acetone furnished 2-methyl-3-oxo-7-methoxy-10a-n-propyl-1,2,3,9,10,10a-hexahydrophenanthrene, I.

Ultraviolet spectrum (ethanol): $\lambda_{max}.$ 327 m$\mu$ $E^{1\%}_{1cm.}$ = 593; $\lambda_{max}.$ 242 m$\mu$ $E^{1\%}_{1cm.}$ = 270

This compound is not described in the literature.

It is to be understood that the invention is not limited to the process of the specific embodiments but that other expedients apparent to those skilled in the art may be employed without departing from the spirit of the invention and the scope of the appended claims.

We claim:

1. The process of producing 2-methyl-3-oxo-7-methoxy-10a - n - propyl - 1,2,3,9,10,10a - hexahydrophenanthrene which comprises the steps of condensing an n-propyl halide with 2-hydroxy methylene-6-methoxy-tetralone-1 in the presence of an alkaline condensation agent, alkalizin the resulting compound with an aqueous alkali metal hydroxide solution, recovering 2 - n - propyl-6-methoxy-tetralone-1, condensing said 2 - n - propyl - 6 - methoxy-tetralone-1 with methyl isopropenyl ketone in a lower alkanol and in the presence of a hydroxide of a quaternary ammonium compound, and recovering 2-methyl-3-oxo-7-methoxy-10a-n-propyl-1,2,3,9,10,10a-hexahydrophenanthrene.

2. The process of claim 1 wherein said hydroxide of a quaternary ammonium compound is the hydroxide of trimethyl benzyl ammonium.

3. The process of producing 2-methyl-3-oxo-7-methoxy-10a - n - propyl - 1,2,3,9,10,10a-hexahydrophenanthrene which comprises the steps of condensing an allyl halide with 2-hydroxy methylene-6-methoxy-tetralone-1 in the presence of an alkaline condensation agent, alkalizing the resulting compound with an aqueous alkali metal hydroxide solution, hydrogenating the resultant 2 - allyl - 6-methoxy-tetralone-1 in the presence of a hydrogenation catalyst, recovering 2 - n - propyl-6-methoxy-tetralone-1, condensing said 2-n-propyl-6-methoxy-tetralone-1 with methyl isopropenyl ketone in a lower alkanol in the presence of a hydoxide of a quaternary ammonium compound, and recovering 2-methyl-3-oxo-7-methoxy-10a-n-propyl-1,2,3,9,10,10a-hexahydrophenanthrene.

4. The process of claim 3 wherein said hydroxide of a quaternary ammonium compound is the hydroxide of trimethyl benzyl ammonium.

References Cited by the Examiner

UNITED STATES PATENTS 2,272,122　2/42　Lee _____ 260—593

OTHER REFERENCES

Gaind et al.: J. Indian Chem. Soc., vol. 33, pages 1–8 (1956).

Stork et al.: J. Am. Chem. Soc., vol. 78, pages 501–2 (1956).

LEON ZITVER, *Primary Examiner.*